United States Patent [19]

Wallis

[11] 4,149,243
[45] Apr. 10, 1979

[54] DISTRIBUTED CONTROL ARCHITECTURE WITH POST AND WAIT LOGIC

[75] Inventor: Donald E. Wallis, Marblehead, Mass.

[73] Assignee: International Business Machines Corporation, Armonk, N.Y.

[21] Appl. No.: 843,902

[22] Filed: Oct. 20, 1977

[51] Int. Cl.² .......................... G06F 9/18; G06F 15/16
[52] U.S. Cl. ..................................................... 364/200
[58] Field of Search ......................... 364/200 MS File

[56] References Cited

U.S. PATENT DOCUMENTS

| | | | |
|---|---|---|---|
| 3,374,465 | 3/1968 | Richmond et al. | 364/200 |
| 3,634,830 | 1/1972 | Baskin | 364/200 |
| 3,643,227 | 2/1972 | Smith et al. | 364/200 |
| 3,648,252 | 3/1972 | Thron et al. | 364/200 |
| 3,801,962 | 4/1974 | Moore et al. | 364/200 |
| 3,810,105 | 5/1974 | England | 364/200 |
| 3,943,494 | 3/1976 | Holmes, Jr. et al. | 364/200 |
| 3,962,685 | 6/1976 | Belle Isle | 364/200 |
| 4,014,005 | 3/1977 | Fox et al. | 364/200 |
| 4,041,461 | 8/1977 | Kratz et al. | 374/200 |
| 4,071,890 | 1/1978 | Pandeya | 364/200 |

OTHER PUBLICATIONS

J. K. Boggs, Jr. et al., "Input/Output Channel Mechanism For Handling Control Unit Busy Status" in IBM Tech. Discl. Bull, vol. 19, No. 7, Dec. 1976; pp. 2488-2490.

M. J. Mitchell, Jr., "Input/Output Control Unit Busy Disconnect Mechanism" in IBM Tech. Discl. Bull., vol. 19, No. 8, Jan. 1977; pp. 2999-3002.

*Primary Examiner*—Melvin B. Chapnick
*Attorney, Agent, or Firm*—John E. Hoel

[57] ABSTRACT

Distributed control architecture for a multiprocessor system includes a control processor operating on system programming instructions for executing system supervisory and task management functions, and a control bus over which it outputs execute instruction words containing a pointer address. Program storage stores threaded link lists of intermediate level instruction words, each list head being pointed to by the pointer address of respective execute instruction words. A first subunit processor for executing a first type function has a control input connected to a first distributed control interface processor and includes first post and wait logic for posting a signal indicating completion of a first type function. The first distributed control interface processor has a control input connected to the control bus for receiving the execute instruction word and a data input connected to program storage for accessing intermediate instruction words from a link list pointed to by the pointer address in the execute instruction word, and includes stored control programs to execute first type functions, each accessed by a respective intermediate instruction word. Each control program includes control words sequentially output to the first subunit processor. A second subunit processor controlled by a second distributed control interface processor executes a second type function in a manner similar to the first subunit processor, and includes second post and wait logic for posting a signal to the first subunit processor's post and wait logic indicating completion of a second type function, and a corresponding operation is performed by the first subunit processor's post and wait logic to coordinate execution of mutually dependent first and second type subunit functions. Thus, the control processor can initiate tasks to be performed by the first and second subunit processors and then be free to execute system supervisory and task management functions while the first and second type subunit functions are performed under control of the first and second distributed control interface processors.

9 Claims, 9 Drawing Figures

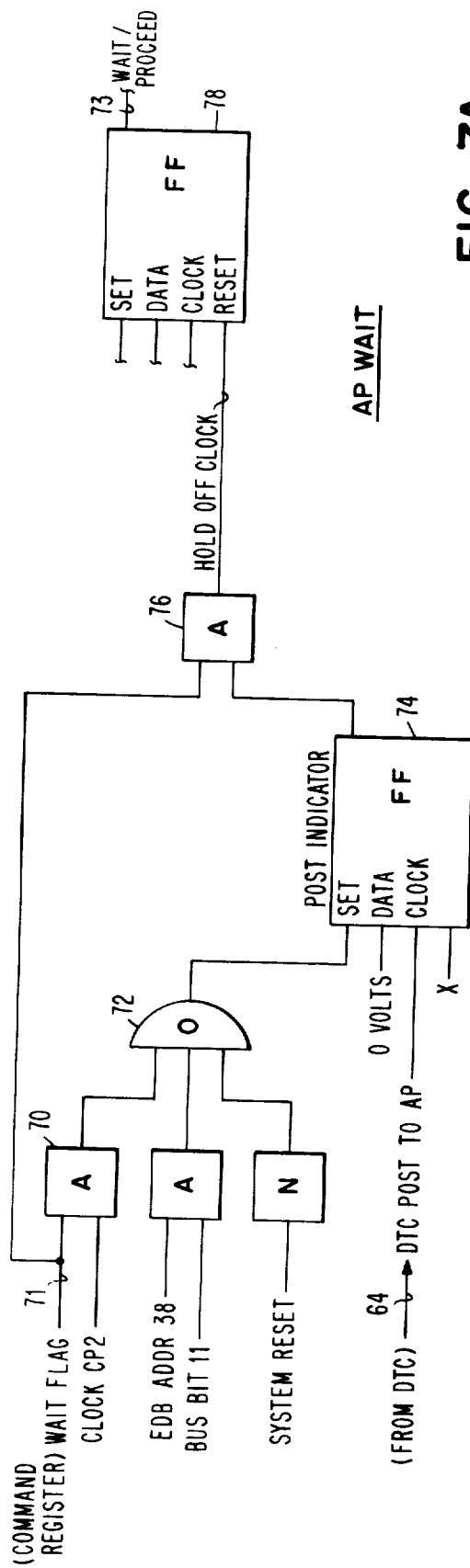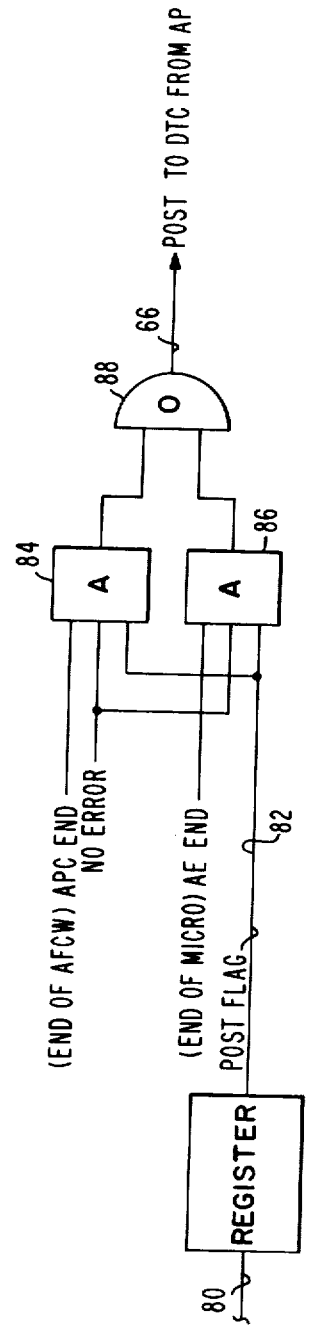

DISTRIBUTED CONTROL ARCHITECTURE WITH POST AND WAIT LOGIC

FIELD OF THE INVENTION

The invention disclosed broadly relates to data processing systems and more particularly relates to multi-processor systems.

BACKGROUND OF THE INVENTION

High speed, general purpose data processing systems have been designed in the prior art to handle certain generic types of data processing problems. In particular, data processing systems designed to handle a variety of matrix manipulation problems, called array processors, have become exceedingly important in signal analysis where signals are characterized by means of digital filtering and fast fourier transform analysis. A specific example of such a prior art system is shown in U.S. Pat. No. 4,041,461 by Gary L. Kratz, et al, assigned to the instant assignee, which discloses a signal analyzer system which employs a control processor for centrally controlling the operation of an arithmetic processor and a storage transfer controller by means of sending a sequence of command instructions and control parameters to these respective, dependent processor elements.

In the prior art multiprocessing system represented by the Kratz, et al patent, the control processor was required to continually issue specific command words to the arithmetic processor and the storage transfer controller and a typical problem solution would require that seventy percent of the control processor's time be devoted to the preparation of commands dealing with trivial functions to be carried out by the arithmetic processor or storage transfer controller. In addition, when mutually dependent functions were to be performed by the arithmetic processor and storage transfer controller had to load a working store prior to the execution of the arithmetic process by the arithmetic processor and then the arithmetic processor had to indicate to the storage transfer controller when to unload the results of that arithmetic process, it was necessary to communicate these completion status points between these dependent processors through the control processor itself. These communication interrupts consume still more of the time of the control processor. Thus, less than twenty percent of the control processor's time was available for system executive functions as a resource allocator and task manager for the system. This resulted in impeding the total throughput of the system and rendering it incapable of expansion to control additional dependent processors.

OBJECTS OF THE INVENTION

It is therefore an object of the invention to improve the coordination of dependent activities between subunit processors in a multiprocessing system.

It is another object of the invention to distribute the control functions of preparing, modifying and generating control words to the subunit processors in a multiprocessing system.

It is still a further object of the invention to increase the time available to a control processor in a multiprocessing system for system executive functions, resource allocation functions and task management functions.

SUMMARY OF THE INVENTION

These and other objects, features and advantages of the invention are accomplished by the distributed control architecture disclosed herein.

A distributed control architecture for a multiprocessor system is disclosed. The architecture includes a control processor operating on system programming instructions, for executing system supervisory and task management functions, having a control bus over which it outputs execute instruction words containing a pointer address. A program storage stores threaded link lists of intermediate level instruction words, the head of each list being pointed to by the pointer address of a respective one of the execute instruction words. A first subunit processor for executing a first type function, has a control input connected to a first distributed control interface processor. The first subunit processor includes a first post and wait logic mechanism for posting an output signal indicating the completion of a first type function. The first distributed control interface processor has a control input connected to the control bus from the control processor, for receiving the execute instruction word and it has a data input connected to the program storage for accessing the intermediate instruction words from a link list pointed to by the pointer address in the execute instruction word. The first distributed control interface processor includes a plurality of stored control programs to execute first type functions each of which is accessed by a respective one of the intermediate instruction words. Each control program includes a sequence of control words which are sequentially output to the first subunit processor. A second subunit processor controlled by a second distributed control interface processor, executes a second type function in a manner similar to the first subunit processor. The second subunit processor includes a second post and wait logic mechanism for posting an output signal to the post and wait logic mechanism in the first subunit processor indicating the completion of a second type function, and a corresponding operation is performed by the first post and wait logic mechanism in the first subunit processor, so as to coordinate the execution of mutually dependent first and second type subunit functions. With this architecture, the control processor can initiate tasks to be performed by the first and second subunit processors and then be free to execute system supervisory and task management functions while the first and second type subunit functions are being performed under the control of the first and second distributed control interface processors.

DESCRIPTION OF THE FIGURES

These and other objects, features and advantages of the invention will be more fully appreciated with reference to the accompanying figures.

FIGS 7A and 7B are a schematic representation of the post and wait logic.

DISCUSSION OF THE PREFERRED EMBODIMENT

Figure 1:
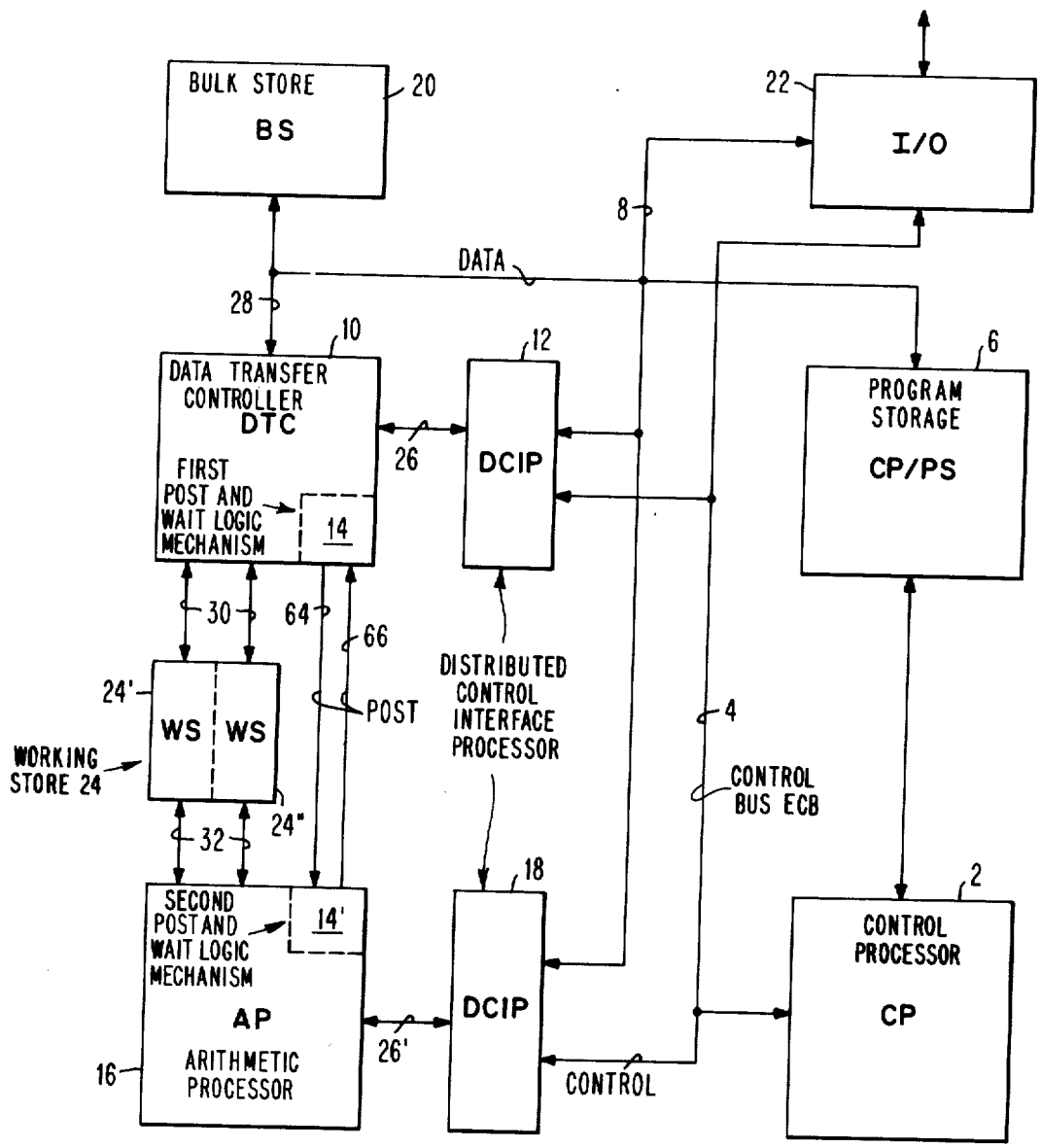
FIG. 1 is an overall block diagram of the distributed control architecture.

FIG. 1 is a block diagram of the system functional organization for the multiprocessor system. The control processor (CP) 2 operates on system programming level language instructions, for executing systems supervisory and task management functions. The control processor has a control bus (ECB) 4 over which it outputs execute instruction words containing a pointer address. A program storage (CP/PS) 6 stores threaded link lists of intermediate level instruction words, the head of each list being pointed to by the pointer address of a respective one of the execute instruction words.

A first subunit processor is the data transfer controller (DTC) 10 which executes a first type subunit function, which in the case of the data transfer controller is the passage of data blocks between the bulk store 20 and the working store 24' and 24". The data transfer controller has a data input/output line 28 from the bulk store 20 and a data input/output line 30 to the arithmetic processor 16.

Figure 2:
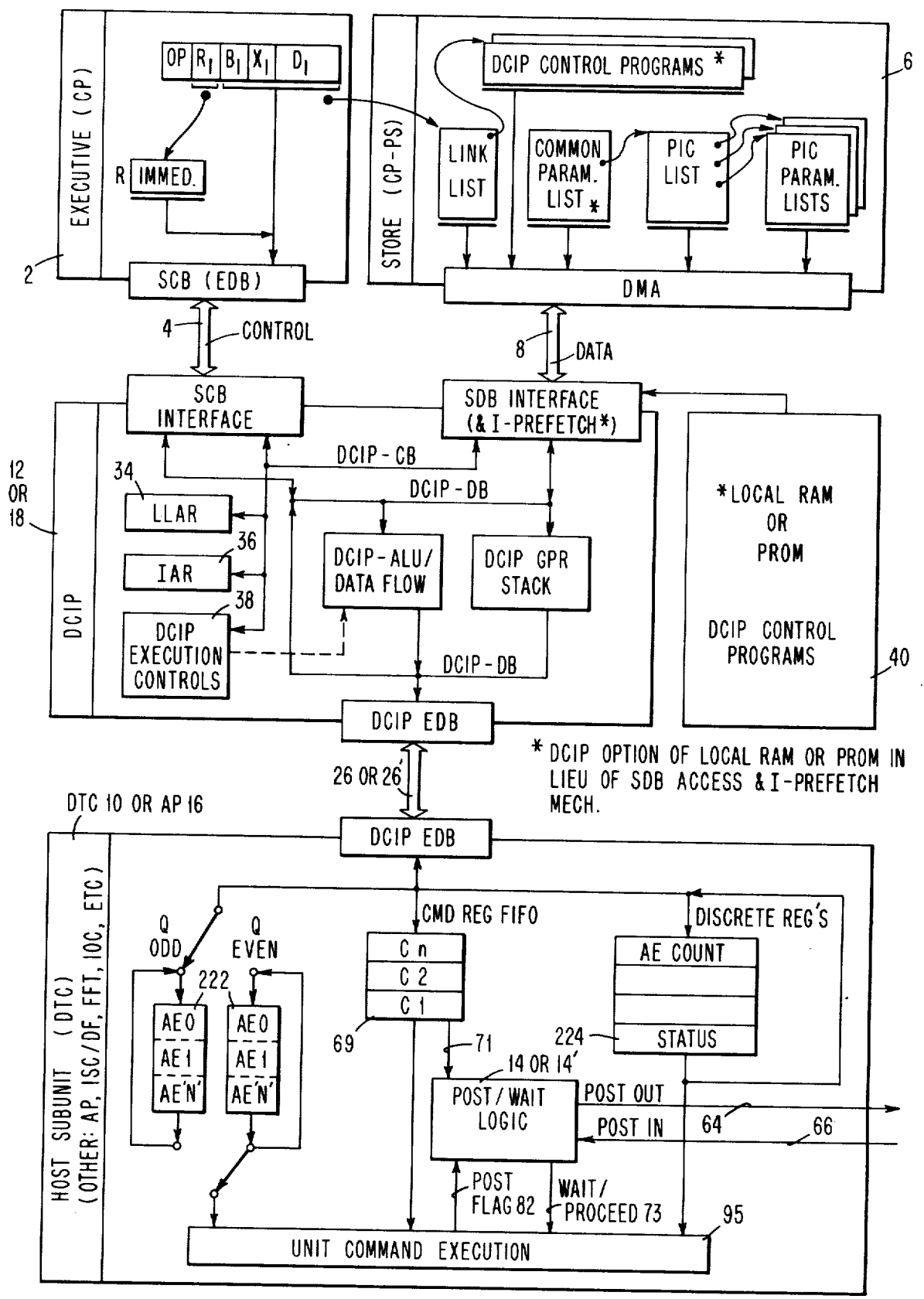
FIG. 2 is a more detailed block diagram of the distributed control architecture.

As is seen in the more detailed illustration of FIG. 2, the data transfer controller 10 has a control input 26 from the distributed control interface processor 12. The data transfer controller 10 includes a first post and wait logic mechanism 14, for posting an output signal indicating the completion of a first type function. A detailed description of the data transfer controller 10 can be found in U.S. Pat. No. 4,041,461 in its FIG. 18 and the associated text directed to the storage controller therein.

The first distributed control interface processor 12 connected to the data transfer controller 10, has a control input connected to the control bus 4 for receiving the execute instruction word. The distributed control interface processor (DCIP) 12 also has a data input connected by means of the system data bus 8 to the program storage 6, for accessing the intermediate instruction words from the link list pointed to by the pointer address in the execute instruction word. The distributed control interface processor includes a plurality of stored control programs, stored in the local programmable read only memory (PROM) 40 shown in FIG. 2, to execute the first type subunit function. Each control program is accessed by a respective one of the intermediate instruction words. Each control program includes a sequence of control words which are sequentially output over the control output 26 to the data transfer controller 10.

A second subunit processor is the arithmetic processor (AP) 16, which executes a second type subunit function, in this case arithmetic processing operations. Arithmetic processor 16 has a data input and output line 32 connected to the working store 24. The arithmetic processor 16 also has a control input 26' which is connected to its distributed control interface processor 18. The arithmetic processor 16 includes a second post and wait logic mechanism 14' for posting an output signal to the first post and wait logic mechanism 14 in the data transfer controller 10, indicating the completion of the second type arithmetic function. The first post and wait logic mechanism 14 in the data transfer controller 10, posts its output signal to the second post and wait logic mechanism 14' in the arithmetic processor 16, for coordinating the execution of mutually dependent first and second type subunit functions.

A second distributed control interface processor 18 has a control input connected to the control bus 4 for receiving the execute instruction word. The DCIP 18 has a control output 26' connected to the arithmetic processor 16. The DCIP 18 also has a data input connected by means of the system data bus 8 to the program storage 6 for accessing the intermediate instruction words from the link list pointed to by the pointer address in the execute instruction word. The DCIP 18 includes a plurality of stored control programs, stored in its local PROM 40 shown in FIG. 2, to execute second type subunit functions, each of which is accessed by a respective one of the intermediate instruction words. Each control program includes a sequence of control words which are sequentially output over the control output 26' to the arithmetic processor 16. A detailed description of the arithmetic processor 16 can be found in U.S. Pat. No. 4,041,461, particularly with reference to FIGS. 2 and 12 and the test associated therewith discussing the arithmetic element and arithmetic element controller.

The working store 24 has two storage banks, a left band 24' and a right bank 24" which operate in parallel on an interleaved basis and are directly connected to the DTC 10 over bus 30 and to the AP 16 over bus 32. In operation, the working store 24 can, for example, have its left bank 24' loading new data into the AP 16 while its right bank is loading result data processed previously by the AP, into the DTC 10 for transmission to the bulk store 20. A further description of the structure and operation of the working store 24 can be found in the above referenced U.S. Pat. No. 4,041,461.

The operation of the system shown in FIGS. 1 and 2, as described hereafter, enables the control processor to initiate tasks to be performed by the arithmetic processor and data transfer controller and then to be freed to execute system supervisory and task management functions while arithmetic and data transfer type functions are being performed by the AP and DTC, respectively, under the control of their respective DCIP's 12 and 18, respectively. In the following discussion of the operation of the distributed control architecture, reference should be made to FIGS. 1 and 2, as described above.

The elements of the system are tied together primarily by two major buses, i.e. the system data bus 8 and the control bus 4. The system data bus 8 primarily transfers blocks of data between storage elements or between functional elements and the various storage elements in this system. The priority control and allocation for the systems data bus 8 resides as a secondary function within the data transfer controller 10, thus even though the DTC 10 is a transfer controller and a user of the data bus it also processes requests from other elements for use of the data bus on a priority basis. Typically, operations of the input/output 22 have first priority for the bus, the AP 16 has second priority and the data transfer controller 10 has third priority. The primary function of the data transfer controller 10 is to handle the data transfers to and from the bulk store 20 to working store 24 in support of the AP 16 application because the AP 16 is the primary user of the high bandwidth capacity of the bus 8.

Not only is processing data and I/O data transferred on the system data bus 8 to the various storage elements, but primary control messages are also transferred on it from CP program store 6 where they reside to the various DCIPs 12 and 18. Those control messages are the link lists and the parameter lists. The control bus 4, which is the second major bus in the system, is primarily a command status/response interface for the operation of the data transfer controller 10 and the arithmetic processor 16 through the DCIPs 12 and 18, respectively. The control bus 4 is primarily utilized to provide a start signal to DCIPs 12 and 18, that is an initial link list address starts the individual DCIP control processes. For example, when the CP 2 wants to start DTC 10 operation to execute a data transfer, the CP 2 will present over the control bus 4 to the DTC 12 the start address of the link list pointing to the first DCIP control program to be executed. As soon as the DTC DCIP 12 has accepted the address, it will take off on its own and handle all further operations. The first thing the DCIP 12 will do is to issue a request on the systems data bus 8 to access the first link list entry from the CP program store 6. The link list entry is the initial address of the first control program. An instruction address register 36 will sequentially increment the initial address value as instructions are executed by the control program. During the execution of that control program, the DCIP 12 is going to dynamically generate command blocks for the DTC 10 and in the process of doing that it is going to be pulling in the control parameters over the systems data bus 8 from the CP program store 6. This process continues until the link list is completely exhausted. After completion of the existing control program the DCIP 12 will advance the link list address and request over the system data bus 8 the access of the next link list entry from the CP program store, which will be output to the DCIP 12 to start executing the next control program. Additional accessing again takes place over the systems data bus 8 for additional control parameters to generate commands blocks for DTC 10 operation and the process continues until the DCIP 12 gets to the last link list entry which is the end of the current user's process specified in the link list. At this time, the next use of the control bus 4 is the presentation of the end status.

Basically the relationship between the DCIPs 12 and 18 and the major busses 4 and 8 linking the systems components together is summarized as follows. The systems data bus 8 is used for presenting link list entries to the DCIP 12 or 18 which the DCIP pulls in and also for the fetching by the DCIP's control programs of the control parameters stored in the CP program store 6 to build command blocks for the DTC 10 and AP 16, respectively. The control bus 4 is used to initially start each of the DCIPs 12 and 18 in the system by passing to each respectively, a link list entry and telling it to go. At the end of DCIP operation the other use of the control bus 4 is the presentation of the end-status indicating whether or not the DCIP operation continued to a normal end and whether or not the host unit during the execution of the DCIP program experienced an exception condition. The presentation of end-status is from the DCIP back to the CP 2. The CP sets up the control bus and the DCIP executes the link list, pulling in the control parameters and data parameters, over the system data bus 8, until a complete task has been performed at which time an end-status is sent by the DCIP to the CP to indicate the operation is complete.

Figure 3:
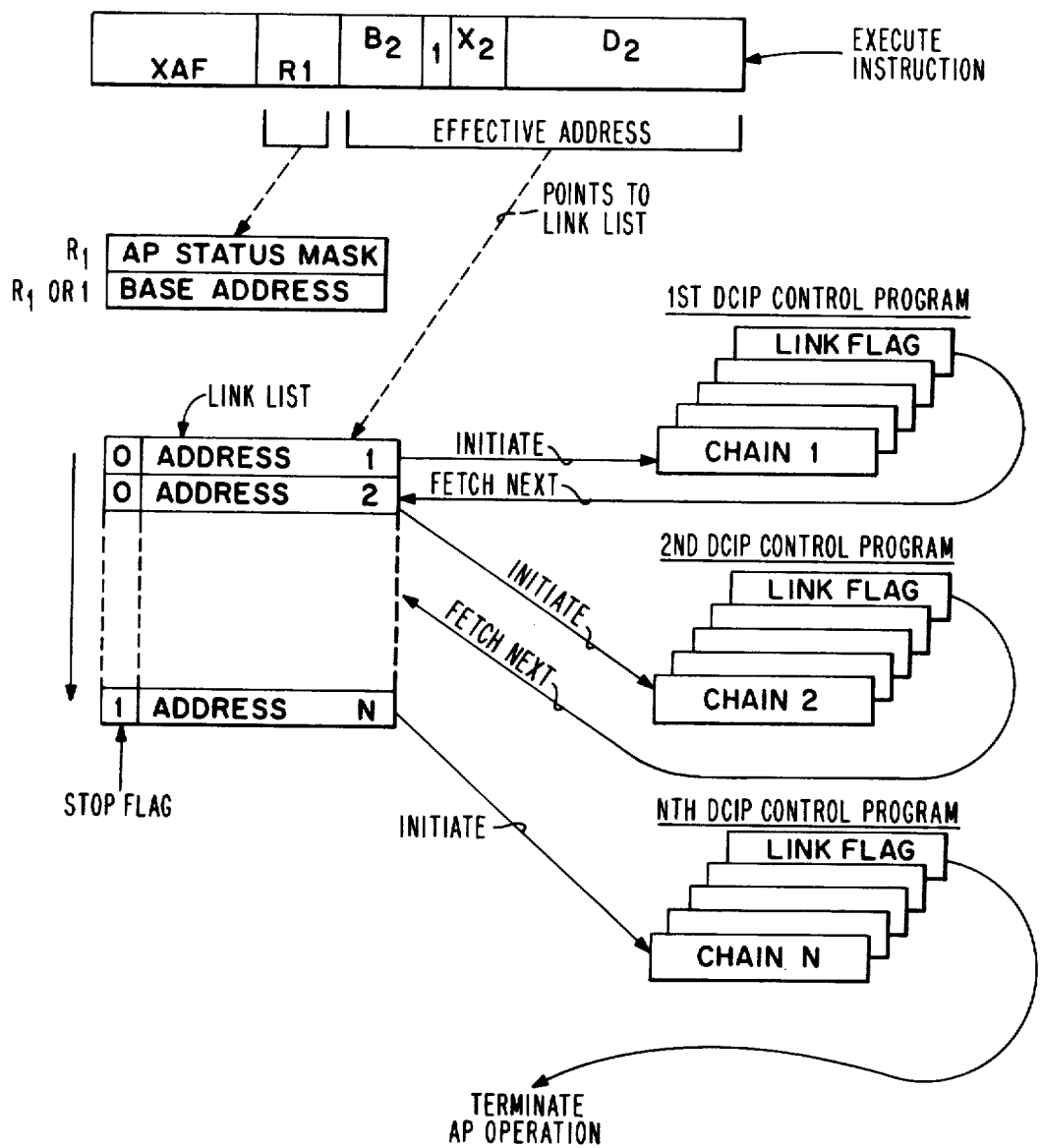
FIG. 3 is a schematic representation of the operation of the link list architecture.

FIG. 2 is a functional block diagram showing the relationship between the control processor 2, the control processor program store 6, a given DCIP element 12 or 18 in the system and the associated host functional subunit that the DCIP is controlling, such as the DTC 10 or AP 16, respectively. Realizing that in a given system there may be multiple functional subunits with their associated DCIPs, to simplify the description, the following describes the initiation of activity of just one DCIP and its subsequent execution of the link list and associated DCIP control programs, as shown in FIG. 3. For this purpose, the DTC 10 and its associated DCIP 12 will be described.

The CP initiates the operation of a functional subunit, in this case assume it is the data transfer controller 10 and its associated DCIP element 12, by the execution of an execute instruction in the CP 2. The execute instruction primarily passes over the control bus 4 interface between the CP 2 and the DCIP 12, an initial address pointing to one of a plurality of link lists resident in CP program store 6. The primary function of the execute instruction is to initiate DCIP execution by transmitting the initial link list address. Once the initial link list address has been accepted by the DCIP element 12, all further execution of the desired process is totally under control of the DCIP element 12. The DCIP 12 stores the initial link list address in link list address register 34 and via the systems data bus 8, and requests the initial link list entry to be transferred to it from program store 6 over the systems data bus 8. The initial link list entry contains the initial instruction address for the first DCIP control program to be executed. That initial DCIP control program address is placed into the instruction address register 36 and points to one of a plurality of DCIP control programs. The DCIP control programs are stored in a local programmable read only memory (PROM) 40 located in the DCIP 12 for the DTC 10 and in the DCIP 18 for the AP.. Alternately, for systems having only a small number of subunit processors such as the DTC 10 and AP 16, the DCIP control programs can be resident in the CP program store 6 and accessed by the DCIP over the systems data bus 8, using a prefetch mechanism similar to that shown in FIGS. 8 and 9a-9c of U.S. Pat. No. 4,041,461 to Kratz, et al. and assigned to the instant assignee.

In either case, the initial link list entry contains the initial instruction address for execution of the first DCIP control program. At that point the DCIP executes that first program by a normal sequential updating of its instruction address register 36, accessing the DCIP control program instructions into its execution control 38 from its own local PROM 40 which stores the DCIP control programs. The completion of the DCIP control program is indicated by an instruction with a link flag which indicates the last instruction to be executed. The link flag is actually a control flag in the DCIP instruction format. When the DCIP executes an instruction which has a link flag at the completion of its execution, the DCIP will examine the current link list entry and determine whether or not it contains a stop flag. If the current link list entry does not contain a stop flag, the DCIP will advance the contents of the link list address register and will request over the systems data bus 8 that the next link list entry be passed back to the DCIP over the systems data bus 8 to initiate the next DCIP control program execution by becoming the initial instruction address in the instruction address register 36. The second control program pointed to by the second link list entry will again proceed until it executes an instruction with a link flag, signalling the end of that DCIP control program or subroutine. Assuming that this is the last of a sequence of DCIP control programs to be referred to by the link list, the DCIP will examine the current link list entry to determine if there is a stop flag. If there is in fact a stop flag in the current link list entry, that signals the end of the current sequence of processes defined by the link list and at that time the DCIP will formulate its end-status by accessing status conditions from the host unit as well as its own internal status conditions, namely its last link list address and its last IAR 36 address and it will present this by the systems control bus 4 to the CP 2.

FIG. 3 shows the relationship between the execute instruction, the link list, and the DCIP control programs. The execute instruction initiates DCIP operation by providing the DCIP with a pointer to the link list. The link list in turn directs the DCIP to a series of desired DCIP control programs to perform the desired application process. The DCIP control programs in turn will access from program store 6 the common control parameters, process input channel (PIC) control parameters and process variable parameters over the systems data bus 8 as required by that particular control program to generate command blocks to the host subunit 10 that the DCIP 12 is controlling. The levels are controlled by the execute instruction which starts DCIP operation in a specific DCIP. Separate execute instructions can be sent to each respective DCIP. The rest of the subunit 10 operation is totally under control of the DCIP 12 and is primarily directed by the link list which feeds in sequence to the DCIP the identity of a series of specific control programs to execute.

Figure 4:
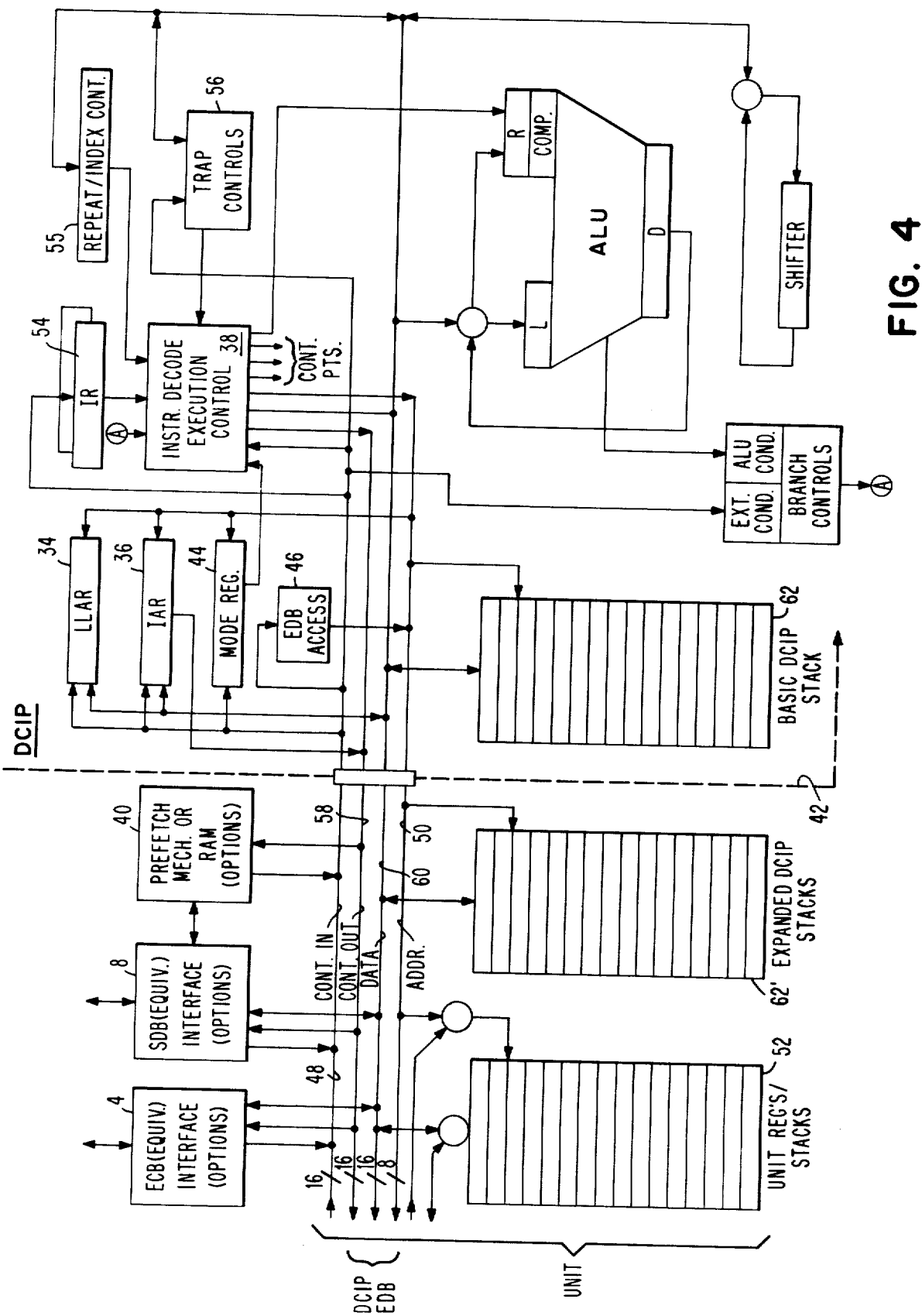
FIG. 4 is a detailed illustration of the distributed control interface processor.

FIG. 4, shows a functional block diagram of the DCIP element 12 or 18. The area to the right of the dotted line 42 indicates the basic DCIP element. The area to the left of the dotted line 42 identifies optional extensions of the DCIP through addressing expansion available in the DCIP architecture and also specifies options external to the basic DCIP data flow associated with equivalents to the systems control bus 8 and a systems data bus 4. FIG. 4 also shows to the left of line 42, the option in the DCIP of allowing a multiplicity of DCIPs to share a common storage element such as the CP program store 6 over the data bus 8 and control bus 4 for both its link list, its control programs and its parameter lists. Alternately, each DCIP element may have its own local store formed with a PROM and/or RAM 40 to support the requirements of the control program. To the right of line 42, the basic DCIP organization includes the major functional elements in the data flow and the major busses as previously described with reference to FIG. 2. The link list address register 34 shown in FIG. 4 holds the current pointer into the link list and during the execution by the CP of the execute command, receives the initial link list address which initiates DCIP operation. At the completion of each DCIP control program as indicated by the detection of a link flag, the DCIP will examine the current link list entry to determine whether there is a stop flag. If there is no stop flag, the link list address register LLAR 34 will be incremented and that new address will be used by the DCIP to fetch the next link list entry to continue with the execution of the next DCIP control program. Just below the link list address register 34 is the instruction address register 36 which is initialized each time by the entry from the link list. Each link list entry represents an initial start address for the DCIP program so that during the link list operation, the link list entry is fetched and placed in the instruction address register to initiate a specific DCIP control program execution. The execution of the control program under the control of the instruction address register 36, will proceed in the normal fashion as governed by any conventional data processing element as is shown for example in the above referenced U.S. Pat. No. 4,041,461. For sequential instruction execution where no branch is indicated, the instruction address register 36 will simply be incremented. Branch operations will cause a jump value to be applied to the instruction address register 36 to initiate a jump operation. Typically, the DCIP element utilizes a relative jump concept in branching operations rather than a placement address so that the DCIP programs are readily relocatable in a shared storage element.

The mode register 44 is the basic control register which governs various modes of operation of the DCIP, the primary mode being the normal run mode in which instructions are executed at execution rate to a normal completion. Other modes afforded by the mode register 44 include a diagnostic mode which allow the DCIP programs to operate in a single step for program debug and diagnostic purposes.

Just below is the EDB access 46 which is a cross coupling between the DCIP control-in bus 48 and the DCIP address bus 50. The purpose of EDB access 46 is to allow the CP 2 via the external control bus 4 to directly gain access to internal DCIP registers and unit registers 52 by placing an address directly from the control-in bus 48 onto the address bus 50.

The instruction register 54 holds the current DCIP instruction presented to the DCIP command decode and execution controls 38 for execution of the instruction under the control of the index counter 55. A trap control 56 facilitates the interrupts of the current DCIP control program and saves the current instruction address. It supports branch, link, and return operations from an interrupt routine. The sources of an interrupt may be the CP 2 via the external control bus 4 or the host control unit via a control interface.

In FIG. 4, the DCIP output bus called the DCIP EDB in FIG. 2 includes the control out 58, data 60 and address 50 lines which correspond to the external data bus 32 in the above referenced U.S. Pat. No. 4,041,461.

The host subunit 10 or 16 shown in FIG. 2 can be a variety of processor types. For example, the arithmetic processor (AP) 16 host unit can be the arithmetic element shown in FIG. 2 referenced above in U.S. Pat. No. 4,041,461, with its arithmetic element controller shown in FIG. 12 of U.S. Pat. No. 4,041,461. In that application, the DCIP EDB 26' connecting the DCIP 18 to the AB 16 shown in FIG. 2 herein, corresponds to the external data bus line 32 shown in the referenced patent. Alternately, the data transfer controller (DTC) 10 host unit of FIG. 2 herein can be the storage transfer controller (STC) 8 of the above referenced U.S. Pat. No. 4,041,461, shown in particular at FIG. 18 thereof where the external data bus 32 is the same as the DCIP EDB 26 shown in FIG. 2 herein connecting the DCIP 12 to the DTC 10. Indeed, in FIG. 18, of the referenced patent, the Q registers 222 are shown by the corresponding number in the host subunit of FIG. 2 herein and the status register 224 is shown by the corresponding number in FIG. 2 herein.

One of the principal features of the distributed control architecture disclosed herein is the use of similar DCIP modules as shown in FIGS. 2 and 4 to provide distributed control to a variety of processor subunits as for example the arithmetic processor 16 or the data transfer controller shown in FIG. 1 herein. One of the problems which would arise with such distributed control, however, is the coordination of dependent operations which may be required in the respective subunits. For example, in the system architecture shown in FIG. 1, the data transfer controller 10 is responsible for loading the working store 24 with the data which in turn is to be operated upon by the arithmetic processor 16 shown in FIG. 1. It can be readily seen that the arithmetic processor 16 cannot commence operation until the working store 24 has been completely filled by the data transfer controller 10 and correspondingly the data transfer controller 10 cannot empty the contents of the working store 24 after such processing until the arithmetic processor 16 has completed its operation. Thus, the need for the post and wait logic 14 which will be described herein after is seen. The post and 14 wait logic serves to coordinate the respective tasks of the arithmetic processor and data transfer controller for dependent operations performed therein.

It might be noted that the arithmetic element disclosed in FIGS. 2 and 12 of the above referenced U.S. Pat. No. 4,041,461 is a microprogram controlled processor. Thus, individual DCIP instruction words sent by the DCIP 18 to the arithmetic processor 16, for example, will elicit different microprogram instruction routines for controlling the elementary functions necessary to perform arithmetic operations. Thus, it is seen that there are at least four levels of hierarchial control when the host subunit 16 is a microcontrolled processor, namely the CP instruction word pointing to a link list, each word in the link list pointing to a separate DCIP control program in the DCIP PROM 40 and individual DCIP control words eliciting separate microcontrol routines, each made up of micro control instructions.

Figure 5:
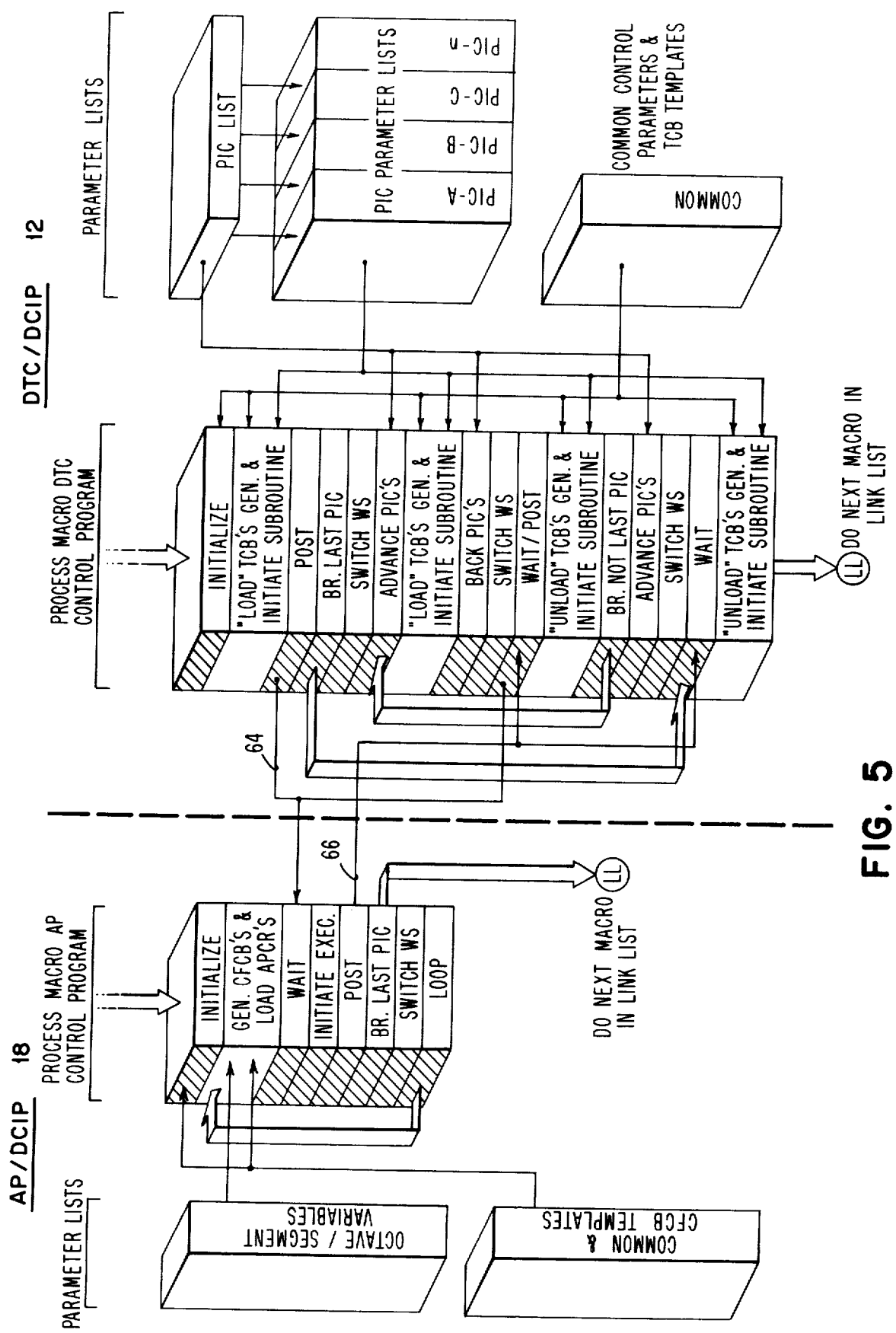
FIG. 5 is a schematic illustration of the coordination of processing activities between two dependent subunit processors.

FIG. 5 shows in concept two DCIP elements operating in parallel, one supporting an arithmetic processor element 16 and the other supporting a data transfer controller element 10. What is described here is the generic type of operation performed by the DCIP for each of the subunit processor elements and more importantly, the coordination function between the AP 16 operation and the DTC 10 operation performed by the post/wait logic 14. The operation of the AP 16 and associated DCIP 18 and the DTC 10 and associated DCIP 12 is initiated by the CP 2 as previously described for FIGS. 2 and 3. The control processor 2 executes execute-class instructions and passes to both the AP DCIP 18 and DTC DCIP 12 respective link list addresses. The AP DCIP 18 and the DTC DCIP 12 will proceed in parallel operations until either one of them arrives at a command which specifies a wait operation. Although the AP 16 and DTC 10 are operating in parallel, the description will first discuss the operation performed by the DCIP 12 in the process of controlling the data transfer controller 10.

Upon receipt of its initial link list entry as previously described, the DCIP 12 will utilize that link list address to fetch the initial link list entry and start executing its DCIP control program specified by the link list entry. After initializing itself by bringing into its general purpose register stack 62 some primary control parameters, as indicated in FIG. 4, the DCIP 12 proceeds to load into the data transfer controller 10, a set of command blocks for initial load functions from bulk store 20 to the left bank of working store 24'. The completion of the initial load function into the left bank of working store 24' is indicated by an instruction in DCIP 12 that is timed to give a post signal 64 to the AP 16 and its associated DCIP 18 to indicate that a prerequisite load function has been accomplished by the DTC 10. At this time the DTC DCIP 12 will proceed with additional instruction execution and proceed to load the alternate right working store bank 24".

Regressing in time to pick up the discussion of the AP 16 and its DCIP 18 operation at the point at which it received its execute instruction from the CP 2, it is seen that the AP DCIP 16 also does an initialization of its function, bringing in some primary control parameters from the CP program store 6 and proceeding to generate command blocks for the arithmetic processor 16. The DCIP 18 proceeds to the point where a DCIP control program instruction indicates that the AP 16 is to wait prior to initiating an execution of its command blocks compiled by DCIP 18. It is at this point when the previously described DTC DCIP 12 control program issued the post signal 64 following its initial load sequence. Upon receiving the post signal 64 from the DTC 10, the AP 16 and its associated DCIP 18 control programs are allowed to proceed and initiate the execution of the previously loaded command blocks to the arithmetic processor 16. This is followed by a command issued by the DCIP 18 instructing the arithmetic processor 16 that it is to immediately send a post signal 66 back to the DTC 10 after the execution of the previously compiled arithmetic function commands. Returning to the DTC 10 and its associated DCIP 12, it is now at the point at which the previously described post signal 66 by the AP 16 governs the DTC 10 and its DCIP 12 operation. Returning to FIG. 5 where the discussion of DCIP 13 previously left off, its control program was at the point which it was performing the corresponding generation and loading of commands to the DTC 10 associated with the alternate right working store bank 24". Subsequent to the loading of those commands to the DTC 10, the DTC DCIP 12 issues a command to the DTC 10 indicating that it is to switch working store banks 24 and to wait until it receives a post signal 66 from the AP 16 and then immediately upon receiving the post signal 66, the DTC 10 will respond with a post signal back. This combination of wait and post signals allows the DTC DCIP 12 program to proceed with an unload sequence only after the AP 16 and associated DCIP 18 have completed the arithmetic execution of the data initially loaded by the DTC 10 into the left bank of working store 24'. The post back signal associated with the wait command in the DTC 10 and DCIP 12 indicates immediately back to the AP 16 and associated DCIP 18 that the alternate load function into the alternate right working store bank 24" has also been completed and that the AP 16 can immediately progress to execute the arithmetic functions on the alternate right working store bank 24".

After the arithmetic processor 16 has calculated the result data which is inserted into the left bank working store 24', it issues a post signal to the DTC which will then unload the results data from the left bank of working store 24' into the bulk store 20.

Figure 6:
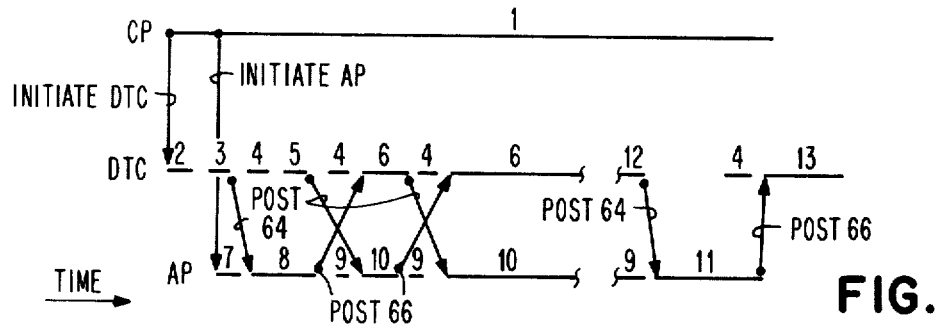
FIG. 6 is a schematic representation of the distribution of functions between the control processor and two subunit processors in carrying out a single task.

FIG. 6 is a schematic representation of the distribution of functions between the control processor 2 and the two subunit processors, the DTC 10 and the AP 16, in carrying out a single task. Typical processing tasks are segmented into smaller, sequential subtasks to both allow data sets larger than working store 24 capacity to be processed and to minimize total system overhead.

The CP 2 initiates the execution of the algorithm in the DTC 6 and AP 16. The CP 2 then performs the set up task for a succeeding algorithm. The time related to set up one algorithm is not related to the time to execute another algorithm.

The initialization phase consists of initializing the first DTC 10 operation (2), initializing the first AP 16 operation (7), and transferring the first set of input data to the working store 24 (3). The initial data transfer and the initialization of the AP 16 are overlapped.

AP 16 processing (8) begins once the initial DTC 10 transfer and AP 16 transfers have been completed. Overlapped with the first processing segment the initialization (4) and transfer (5) of the second input data set. If the segmentation of the first data set is short the execution time of the first segment may be less than transfer of the second data set.

Succeeding data sets overlap transfer of processed data out, transfer of new data in (6) with the execution phase (10). Overhead to initialize the AP (9) and the DTC (4) are additive since both access data from the CP program store (6). Overhead to initialize the AP 16 is less for successive stages than for the first stage for most algorithms since many control registers are self resetting or can be reinitialized by the AP 16 microprogram.

The final processing phase consists of initializing the last processing phase (9), initializing the last data transfer out (12), executing the last processing phase (11), and executing the final data transfer (13).

Thus, it is seen from FIG. 6 that the control processor 2 can initiate tasks to be performed by the DTC 10 and AP 16 subunit processors and then be free to execute system supervisory and task management functions while the DTC and AP subunit functions are being performed under the control of their distributed control interface processors 12 and 18, respectively. FIGS. 7a and 7b are schematic representations of the post and wait logic 14' in the AP subunit processor 16. Corresponding post and wait logic 14 resides in the DTC subunit processor 10. Presented in FIG. 7a is a schematic of the wait logic which operates as follows: If the AP subunit processor 16 encounters a command in the command register 69 containing a wait flag 71 and the post indicator flip-flop 74 is not saving a prior post signal 64 from the DTC 10, AP command executions will be held up via the AND gate 76 and flip-flop 78 which outputs a wait signal 73 to the unit command execution block 95, shown in FIG. 2. A subsequent receipt of a post signal 64 from the DTC 10 will cause resumption of command execution by the AP 16. Note in this case that a wait flag condition presented to flip-flop 74 via the AND gate 70 and OR gate 72 prior to a post signal 64 from the DTC will prevent flip-flop 74 from saving a subsequent post signal. If the AP subunit processor 16 encounters a command containing a wait flag 71 and the post indicator flip-flop 74 is saving a prior post signal 64 from the DTC 10, the prior post indicator will be cleared from flip-flop 74 and AP command execution will proceed without any wait. In summary, if a wait flag 71 is encountered by the AP 16 prior to a post signal 64 from the DTC 10, the AP command execution will be suspended until a post signal 64 is received. A DTC post signal 64 subsequent to the occurrence of a wait flag 71 will prevent the post indicator 74 from being set. If a post signal 64 is received from the DTC prior to the AP encountering a wait flag 71 the post indicator 74 will be set. A subsequent wait flag 71 encountered by the AP 16 will cause the post indicator 74 to be reset and AP command execution will proceed without any delay. FIG. 7b is a schematic diagram of the post logic which operates as follows: If the AP 16 encounters a command in the unit 95 command execution containing a post flag 82 it will send a post signal 66 to the DTC 10 upon completion of that command execution as established by the AND/OR logic 84, 86 and 88. It is noted that the lines labelled "POST OUT 64" and "POST IN 66" in FIG. 2 are directed in the sense used in the DTC's DCIP 12.

Figure 8:
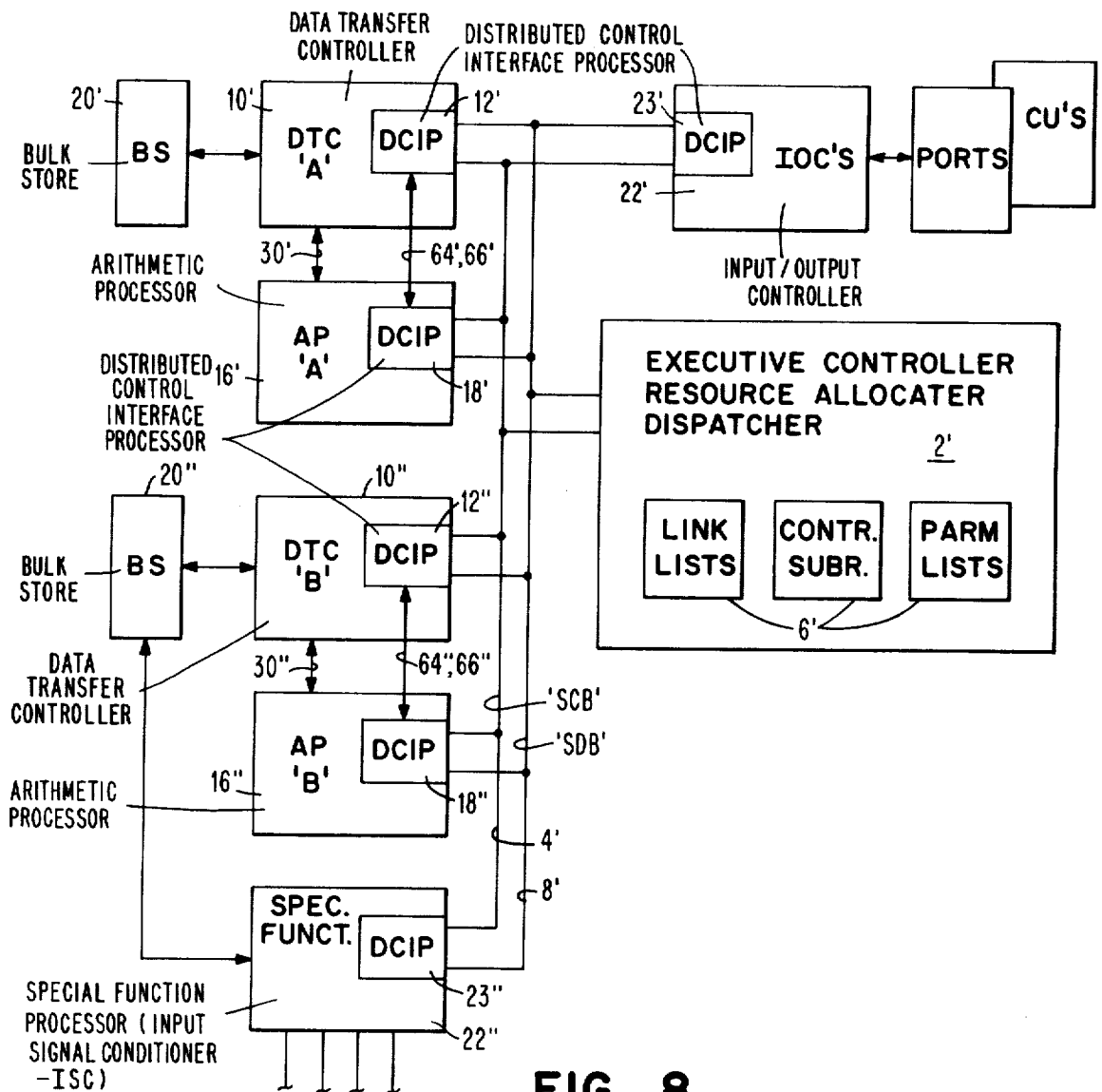
FIG. 8 is a functional block diagram of a multiprocessing system employing more than two distributed control interface processors for more than two host processors.

FIG. 8 is a functional block diagram of a multiprocessing system employing more than two distributed control interface processors for more than two host processors. The elements of FIG. 8 identified by prime numbers correspond to the previously described elements of FIG. 1 identified by the same numbers, unprimed.

The expanded distributed control architecture includes a control processor 2' operating on system programming instructions, for executing system supervisory and task management functions, having a control bus 4' over which it outputs execute instruction words containing a pointer address. A program storage 6' stores threaded link lists of intermediate level instruction words, the head of each list being pointed to by the pointer address of a respective one of the execute instruction words. A first subunit processor such as DTC 10' executes a first DTC-type function and has a control input connected to a first distributed control interface processor 12'. The first DTC processor 10' includes a first post and wait logic mechanism for posting an output signal 64' indicating the completion of a first DTC-type function. The first distributed control interface processor 12' has a control input connected to the control bus 4' from the control processor 2', for receiving the execute instruction word and it has a data input connected to the program storage for accessing the intermediate instruction words from a link list pointed to by the pointer address in the execute instruction word. The first distributed control interface processor 12' includes a plurality of stored control programs to execute first DTC-type functions, each of which is accessed by a respective one of the intermediate instruction words. Each control program includes a sequence of control words which are sequentially output to the first DTC processor 10'. A first AP processor 16' is controlled by a second distributed control interface processor 18' and executes a first AP-type function in a manner similar to the first DTC processor 10'. The first AP processor 16' includes a second post and wait logic mechanism for posting an output signal 66' to the post and wait logic mechanism in the first DTC processor 10' indicating the completion of a first AP-type function, and a corresponding operation is performed by the first post and wait logic mechanism in the first DTC processor 10', so as to coordinate the execution of mutually dependent first DTC-type and first AP-type subunit functions.

A second DTC processor 10" for executing a second DTC-type function, has a control input connected to a third distributed control interface processor 12". The second DTC processor 10" includes a third post and wait logic mechanism for posting an output signal 64" indicating the completion of a second DTC-type function. The third distributed control interface processor 12" has a control input connected to the control bus 4' from the control processor 2', for receiving an execute instruction word and it has a data input connected to the program storage 6' for accessing the intermediate instruction words from a link list pointed to by the pointer address in the execute instruction word. The third distributed control interface processor 12" includes a plurality of stored control programs to execute second DTC-type functions each of which is accessed by a respective one of the intermediate instruction words. Each control program includes a sequence of control words which are sequentially output to the second DTC processor 10". A second AP processor 16" is controlled by a fourth distributed control interface processor 18" and executes a second AP-type function in a manner similar to the first AP processor 16'. The second AP processor 16" includes a fourth post and wait logic mechanism for posting an output signal 66" to the post and wait logic mechanism in the first DTC processor 10" indicating the completion of a second AP-type function, and a corresponding operation is performed by the third post and wait logic mechanism in the second DTC processor 10", so as to coordinate the execution of mutually dependent second DTC-type and second AP-type subunit functions.

An additional input/output processor 22' is controlled by its own DCIP 23' and a special function processor 22" controlled by its own DCIP 23" in a manner similar to that described for the first DTC processor 10' and its associated DCIP 12' is shown in FIG. 8, indicating the great flexibility available with the distributed control architecture concept. With this architecture, the control processor can initiate tasks to be performed by the first and second AP processors 16' and 16", the first and second DTC processors, the IOC 22' and the ISC 22" and then be free to execute system supervisory and task management functions while all of the subunit processor functions are being performed under the control of their respective distributed control interface processors.

While the invention has been particularly shown and described with reference to the preferred embodiments thereof, it will be understood by those skilled in the art that the foregoing and other changes in form and details may be made therein without departing from the spirit and scope of the invention.

I claim:

1. A distributed control architecture for a multiprocessor system, comprising:

a control processor operating on system programming level instructions, for executing system supervisory and test management functions, having a control bus over which it outputs execute instruction words containing a pointer address;

a program storage for storing threaded link lists of intermediate level instruction words, the head of each list being pointed to by the pointer address of a respective one of said execute instruction words;

a first subunit processor for executing a first type subunit function, having a data input and output port and a control input port, and including a first post and wait logic means for posting an output signal indicating the completion of a first type function;

a first distributed control interface processor having a control input connected to said control bus for receiving said execute instruction word, a control output connected to said control input port of said first subunit processor, and a data input connected to said program storage for accessing said intermediate level instruction words from a link list pointed to by said pointer address in said execute instruction word, and including a plurality of stored control programs to execute a first type subunit function, each of which is accessed by a respective one of said intermediate level instruction words, each control program including a sequence of control words which are sequentially output to said control input port of said first subunit processor;

a second subunit processor for executing a second type subunit function, having a data input and output port and a control input port, and including a second post and wait logic means for posting an output signal to said post and wait logic means in said first subunit processor indicating the completion of a second type function;

said first post and wait logic means posting its output signal to said second post and wait logic means in said second subunit processor, for coordinating the execution of mutually dependent first and second type subunit functions; and a second distributed control interface processor having a control input connected to said control bus for receiving said execute instruction word, a control output connected to said control input port of said second subunit processor, and a data input connected to said program storage for accessing said intermediate level instruction words from a link list pointed to by said pointer address in said execute instruction word, and including a plurality of stored control programs to execute second type subunit functions, each of which is accessed by a respective one of said intermediate level instruction words, each control program including a sequence of control words which are sequentially output over said control output to said input port of said second subunit processor;

whereby said control processor can initiate tasks to be performed by said first and second subunit processors and then be free to execute system supervisory and task management functions while the first and second type subunit functions are being performed under control of the distributed control interface processors.

2. The distributed control architecture of claim 1, wherein said program storage is a central storage connected to said first and said second distributed control interface processors.

3. The distributed control architecture of claim 1, wherein said program storage comprises:

a first program storage means connected to said first distributed control interface processor, for storing threaded link lists of intermediate level instruction words, the head of each list being pointed to by the pointer address of a respective one of said executive instruction words, and a second program storage means connected to said second distributed control interface processor, for storing threaded link lists of intermediate level instruction words, the head of each list being pointed to by the pointer address of a respective one of said execute instruction words;

whereby the function carried out by said program storage is distributed among said first and second distributed control interface processors.

4. The distributed control architecture of claim 1, wherein said first subunit processor comprises:

a data transfer control processor having said data input port of said first subunit processor connected to a bulk storage means which stores blocks of data, and having said data output ports and said control input ports of said first subunit processor, for controlling the transfer of said blocks of data from said bulk storage means to said second subunit processor;

whereby storage management functions can be distributed.

5. The distributed control architecture of claim 4, wherein said second subunit processor comprises:

an arithmetic processor having a data input/output line connected to a working store;

said working store having a data input/output line connected to said data transfer control processor;

whereby said arithmetic processor executes arithmetic operations on data transferred into said working store by said data transfer control processor.

6. A distributed control architecture for a multiprocessor system, comprising:

a control processor having a control bus over which it outputs execute instruction words containing a pointer address;

a first subunit processor for executing a first type subunit function, having a first post and wait logic means for posting an output signal indicating the completion of a first type function;

a first distributed control interface processor having a control input connected to said control bus for receiving one of said execute instruction words, a control output connected to said subunit processor, and including a plurality of stored control programs to execute a first type subunit function, each of which is accessed by said pointer address of one of said execute instruction words, each control program including a sequence of control words which are sequentially output to said first subunit processor;

a second subunit processor for executing a second type subunit function, having a second post and wait logic means for posting an output signal to said post and wait logic means in said first subunit processor indicating the completion of a second type function;

said first post and wait logic means posting its output signal to said second post and wait logic means in said second subunit processor, for coordinating the execution of mutually dependent first and second type subunit functions; and a second distributed control interface processor having a control input connected to said control bus for receiving one of said execute instruction words, a control output connected to said second subunit processor, and including a plurality of stored control programs to execute second type subunit functions, each of which is accessed by said pointer address of one of said execute instruction words, each control program including a sequence of control words which are sequentially output over said control output to said second subunit processor;

whereby said control processor can initiate tasks to be performed by said first and second subunit processors and then be free to execute system supervisory and task management functions while the first and second type subunit functions are being performed under control of the distributed control interface processors.

7. The distributed control architecture of claim 6, wherein said first subunit processor comprises:

a data transfer control processor having a data input connected to a bulk storage means which stores blocks of data, for controlling the transfer of said blocks of data from said bulk storage means to said second subunit processor;

whereby storage management functions can be distributed.

8. The distributed control architecture of claim 7, wherein said second subunit processor comprises:

an arithmetic processor having a data input/output line connected to a working store;

said working store having a data input/output line connected to said data transfer control processor;

whereby said arithmetic processor executes arithmetic operations on data transferred into said working store by said data transfer control processor.

9. The distributed control architecture of claim 6, wherein said first subunit processor comprises:

an input/output control processor having a data input connected to an external data source, for controlling the transfer of data from said external data source;

whereby input/output data transfer management functions can be distributed.

* * * * *